United States Patent
Fisher et al.

(10) Patent No.: US 6,864,609 B2
(45) Date of Patent: Mar. 8, 2005

(54) LOW NOISE MOTOR WITH ONE-PIECE FRAME AND TORSION FLUX RING

(75) Inventors: Bryan Todd Fisher, Appin (CA); Stan Simpson, St. Thomas (CA); Eric Bartlett, London (CA); Dumitru Plavosin, London (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 10/888,416

(22) Filed: Jul. 9, 2004

(65) Prior Publication Data

US 2005/0023913 A1 Feb. 3, 2005

Related U.S. Application Data

(60) Provisional application No. 60/490,862, filed on Jul. 28, 2003.

(51) Int. Cl.$^7$ ............................................... H02K 21/26
(52) U.S. Cl. ............................ 310/154.08; 310/154.14; 310/154.15
(58) Field of Search ........................ 310/154.03, 154.08, 310/154.09, 154.12, 154.14, 154.15, 154.44, 154.48

(56) References Cited

U.S. PATENT DOCUMENTS

| | | | | |
|---|---|---|---|---|
| 3,090,877 A | * | 5/1963 | Baumhart .............. | 310/154.14 |
| 3,657,582 A | * | 4/1972 | Phelon .................... | 310/156.31 |
| 4,074,159 A | * | 2/1978 | Robison ................. | 310/154.25 |
| 4,323,804 A | * | 4/1982 | Zelt ............................ | 310/72 |
| 4,467,231 A | * | 8/1984 | Biglino .................. | 310/154.17 |
| 4,619,588 A | * | 10/1986 | Moore, III ................... | 417/366 |
| 4,795,932 A | * | 1/1989 | Long ..................... | 310/154.14 |
| 4,851,729 A | * | 7/1989 | Baines ........................ | 310/239 |
| 6,225,714 B1 | * | 5/2001 | Agnon et al. .................. | 310/51 |
| 6,737,780 B1 | * | 5/2004 | Fisher et al. ........... | 310/154.03 |

* cited by examiner

Primary Examiner—Dang Le

(57) ABSTRACT

An electric motor has a unitary frame. The frame includes locating structure extending from an end portion thereof. The motor includes a shaft and an armature disposed within at least a portion of the frame and constructed and arranged to rotate the shaft. A commutator is associated with the shaft. Windings are carried by the armature and connected to the commutator. Permanent magnet structure is carried by the frame and is disposed generally adjacent to the armature. At least one brush arm is coupled to an associated locating structure. A brush is coupled with an associated brush arm so that the brush engages the commutator to deliver electric current to the windings. A structure, containing iron, is disposed about at least a portion of the permanent magnet structure to define a flux path for the motor.

20 Claims, 5 Drawing Sheets

LOW NOISE MOTOR WITH ONE-PIECE FRAME AND TORSION FLUX RING

This application is based on U.S. Provisional Application No. 60/490,862, filed on Jul. 28, 2003 and claims the benefit thereof for priority purposes.

FIELD OF THE INVENTION

The invention relates to an electric motor having few components and which uses minimal material to thereby lower cost and reduce noise of the motor.

BACKGROUND OF THE INVENTION

Conventional permanent magnet electric motors include a steel frame carrying permanent magnets and defining a flux ring disposed about the frame or magnets. This structure includes large cylindrical surfaces that typically resonate unwanted noise. Typically, the magnets are attached using adhesive or clips to a steel structure that results in increased assembly costs, additional parts, and added scrap.

Accordingly, there is a need to provide a low-cost frame and flux path structure that holds the permanent magnets, has a reduced number of components, and results in a lower natural frequency to reduce audible noise.

SUMMARY OF THE INVENTION

An object of the invention is to fulfill the need referred to above. In accordance with the principles of the present invention, this objective is obtained by providing an electric motor having a unitary frame. The frame includes locating structure extending from an end portion thereof. The motor includes a shaft and an armature disposed within at least a portion of the frame and constructed and arranged to rotate the shaft. A commutator is associated with the shaft. Windings are carried by the armature and connected to the commutator. Permanent magnet structure is carried by the frame and is disposed generally adjacent to the armature. At least one brush arm is coupled to an associated locating structure. A brush is coupled with an associated brush arm so that the brush engages the commutator to deliver electric current to the windings. A structure, containing iron, is disposed about at least a portion of the permanent magnet structure in a manner to define a flux path for the motor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
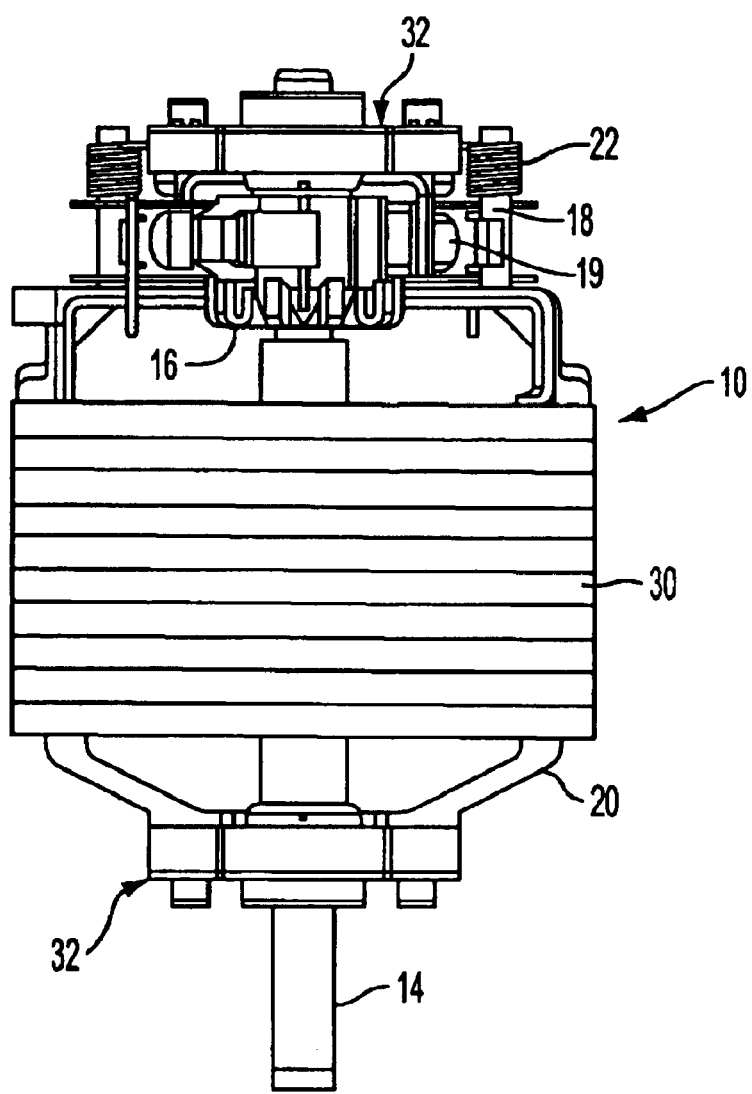
FIG. 1 is a front view of an electric motor provided in accordance with the principles of the invention.
Figure 2:
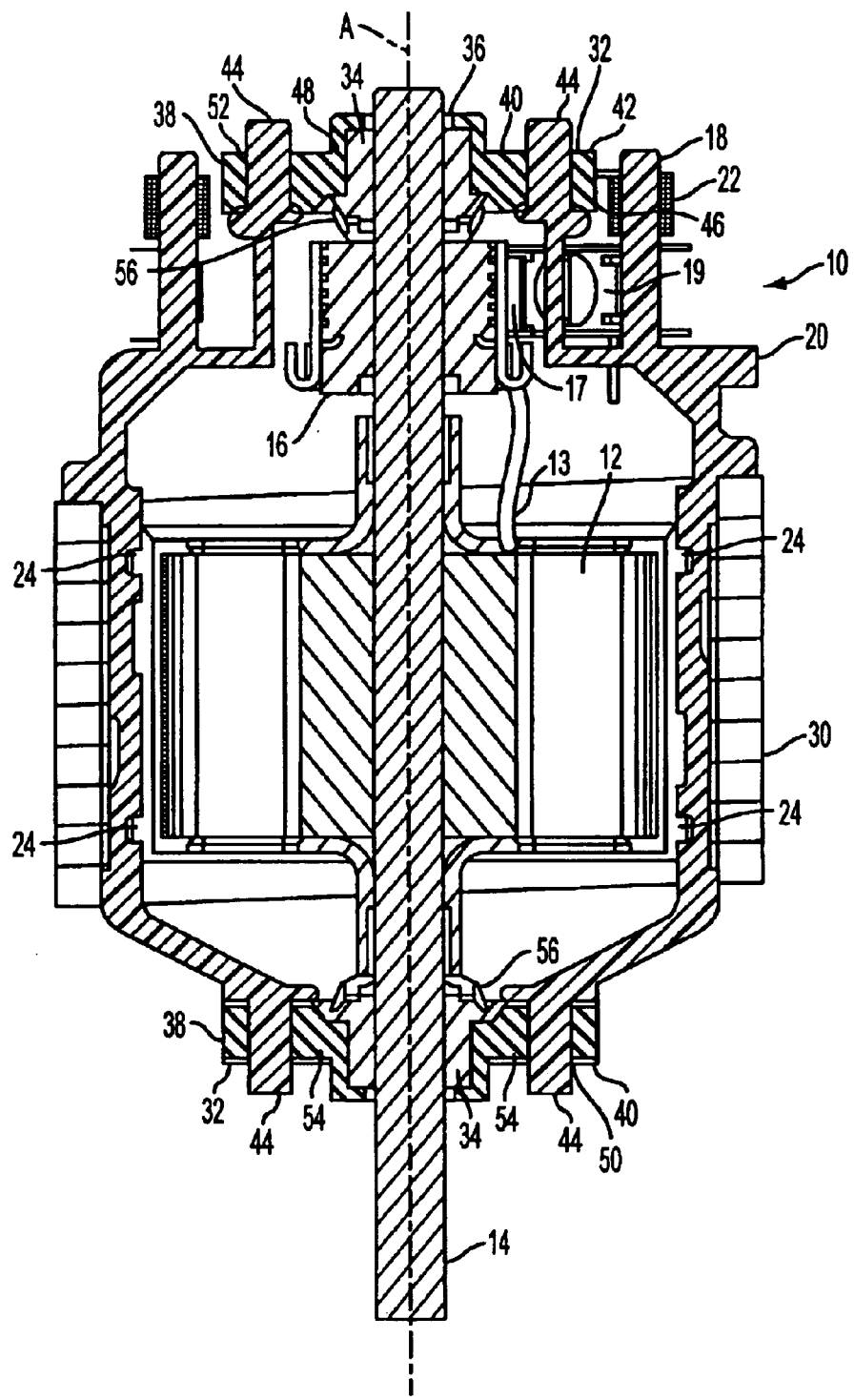
FIG. 2 is a cross-sectional view of the electric motor of FIG. 1.
Figure 3:
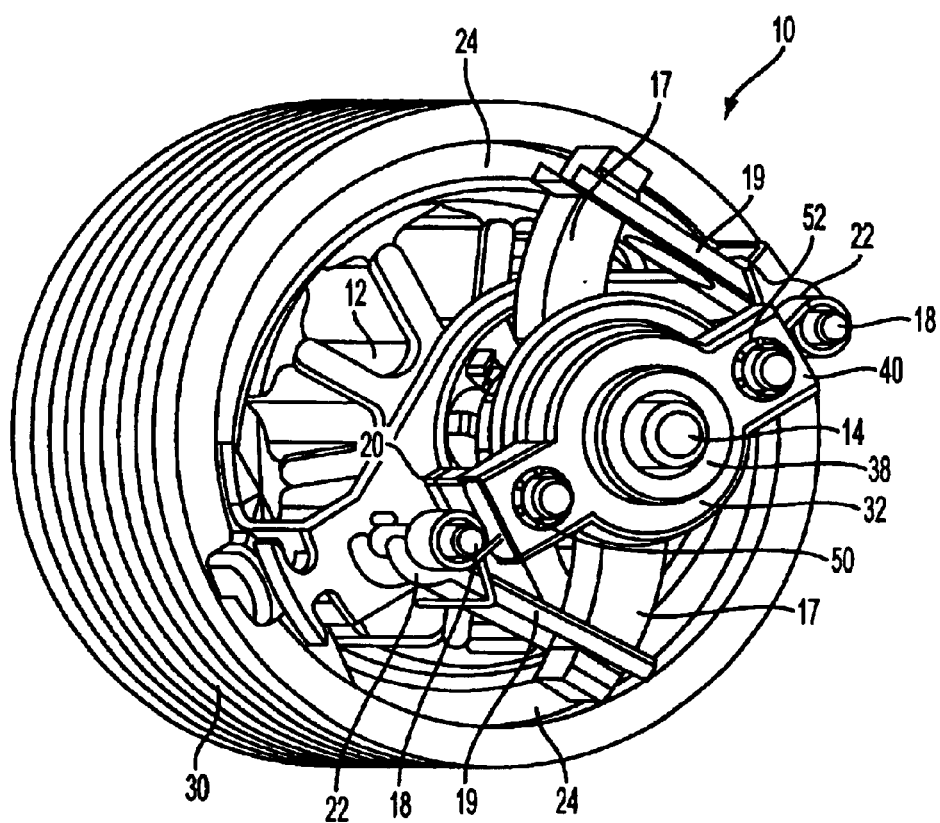
FIG. 3 is a perspective view of a top end of the electric motor of FIG. 1.
Figure 4:
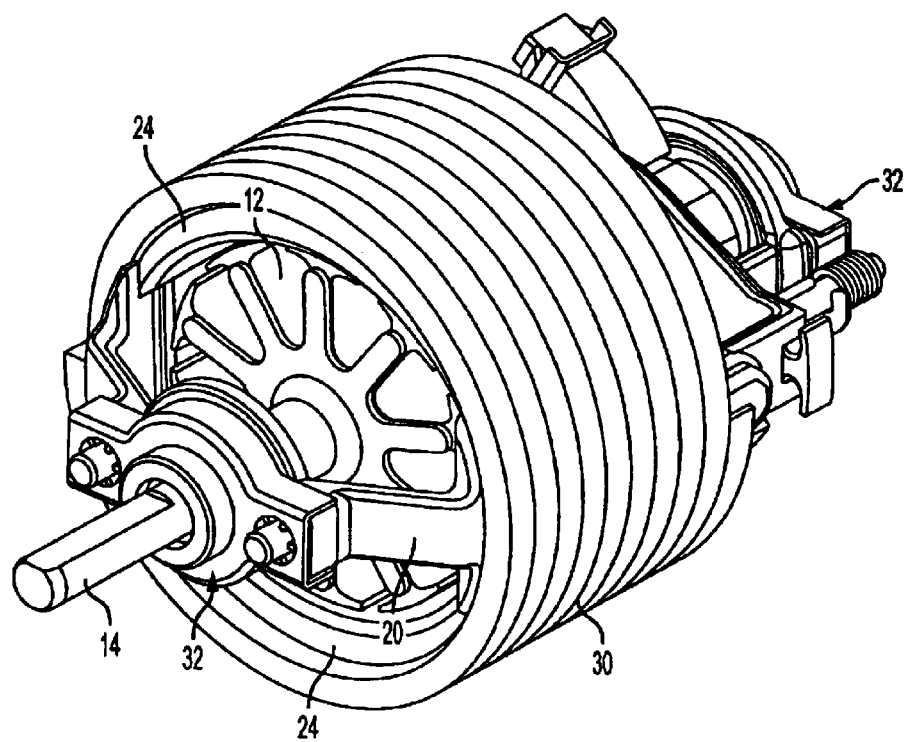
FIG. 4 is a perspective view of a bottom end of the motor of FIG. 1.

With reference to FIGS. 1 and 2, an electric motor is shown, generally indicated at 10, in accordance with the principles of the invention. The motor 10 is preferably configured for automotive HVAC systems. The electric motor 10 includes a lamination stack or armature 12 carrying windings 13 (the complete set of windings is not shown in the interest of clarity of the Figures). The armature 12 is coupled with a shaft 14 to provide rotation of the shaft 14 in the conventional manner. The motor 10 includes a commutator 16 and brushes 17 to engage the commutator 16 and conduct electrical current to the windings 13 which are connected to the commutator 16. In the embodiment and as best shown in FIG. 3, two brushes 17 are provided with each brush 17 being coupled with a conductive hammer brush arm 19. Each brush arm 19 is connected to locating structure or posts 18 extending in a cantilever manner from a frame 20 of the motor 10. A brush spring 22 is mounted to each post 18 to bias the brush arm 19 and thus the brush 17 into contact with the commutator 16. The posts 18 are integral with the frame and can be considered to be part of the frame 20.

Figure 5:
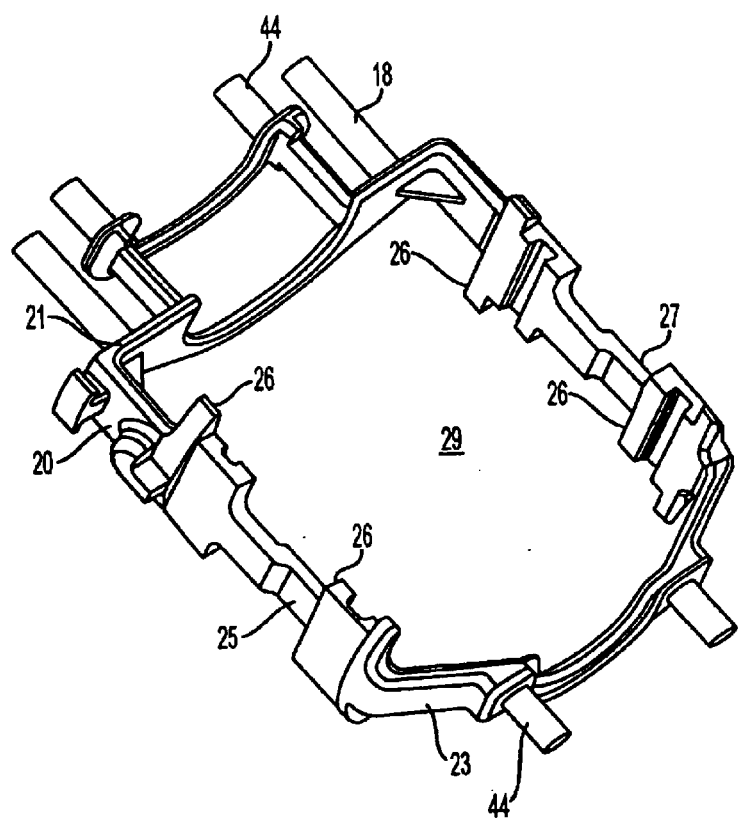
FIG. 5 is a perspective view of the frame of the motor of FIG. 1.

Permanent magnets 24 are disposed generally adjacent to the armature 12. The frame 20, preferably die-cast as a one-piece structure, carries the permanent magnets 24 on magnet receivers 26 (FIG. 5) defined in the frame 20. The magnet receivers 26 thus locate the magnets 24 with respect to the frame 20. The frame 20 can be of any die-cast material or thixomolding or powder metal process, or can be of plastic material. The frame 20 includes opposing end portions 21 and 23, and two side members, 25 and 27 coupled to the end portions to define an open interior space 29 (FIG. 5). The armature 12, windings 13 and permanent magnets 24 are disposed in the open interior space 29. The posts 18 extend from end portion 21 of the frame 20.

In the embodiment, a coil spring structure 30 is provided about the outer periphery of a portion of the frame 20 and thus permanent magnets 24 to define a flux path. In the embodiment, the spring structure 30 is preferably polygonal-shaped rod, hot rolled steel. Since tolerances are not required to be tight, spring steel is an inexpensive material for the flux path. The spring structure 30 is constructed and arranged to contact the permanent magnets 24 to define a flux path of the motor. As used herein, the term "contact" can be direct contact or indirect contact through a ferrous material. In the embodiment, a spring load is exerted by the spring structure 30 towards the axis of rotation A to clamp the permanent magnets 24 to the frame 20. In this embodiment, the spring structure also functions to retain the permanent magnets 24 with respect to the frame assembly 20. More particularly, the spring structure 30 is uncoiled and placed over at least a portion of the frame 20 and is then released to trap or clamp the permanent magnets 24 with respect to the magnet receivers 26 and thus against the frame 20 in a manner similar to that disclosed in commonly assigned, co-pending U.S. application Ser. No. 10/657,656. It can be appreciated that the spring load may be exerted in directions other than towards the axis of rotation A.

The spring structure 30 provides a path of magnetic flux while retaining low scrap producing steel manufacturing methods, and has the ability to conform and engage in a loosely toleranced magnet assembly. The spring structure 30 clamps the magnets 24 to the frame 20 preventing movement of the magnets 24 while maintaining a minimal air gap in the magnetic circuit. With this structure no bonding of the magnets is required. The spring structure 30 eliminates the conventional large cylindrical surfaces that typically resonate noise and replaces these surfaces with a structure of lower natural frequency. The length and the diameter of the coil spring structure 30 can be changed easily to accommodate different magnet saturation levels and applications. It can be appreciated that the coil spring structure main function is to provide a flux path (e.g., with no air gap between the spring structure and the permanent magnets).

Although, in the embodiment, the flux path is defined by the coil spring structure 30, it is within the scope of the invention to provide a solid, cylindrical structure instead of the coil spring structure. Thus, for example, a sheet of iron-containing material can be rolled and locked, or a drawn or cut tube can be provided about the frame and magnets to define the flux path. Spring structure can also be employed to ensure that the cylindrical structure clamps on the permanent magnets as discussed above.

In the embodiment shown in FIG. 2, a sleeve bearing/retainer assembly, generally indicated at 32, is provided at each end of the motor 10. Each sleeve bearing/retainer assembly 32 includes a sleeve bearing 34 having a bore 36 for receiving an end of the shaft 14 to support the shaft for rotation, an elastomer structure 38 that is coupled with the sleeve bearing 34, and a retainer 40 disposed over the elastomer structure 38. The elastomer structure 38 is compressible and can be over-molded with respect to the sleeve bearing 34 or provided about the sleeve bearing 34 in a press-fit arrangement. The elastomer structure 38 includes a pair of tabs extending in opposing directions from a main body of the elastomer structure. Each tab has a bore 42 there through, that is received by an associated post 44 of the frame 20, as will be explained more fully below. The posts 44 extend, from a stop surface 46 defined at each end of the motor, in the axial direction of the shaft 14. The elastomer structure 38 includes a central bore 48 that receives the sleeve bearing 34 when the sleeve bearing 34 is press-fitted into the bore 48.

As best shown in FIG. 2, the retainer 40 covers a portion of the elastomer structure 38 when assembled. In addition, the retainer 40 has a pair of bores 50 there through. Integral spring barbs 52 are defined about the periphery of each bore 50.

The bearing/retainer assembly 32 de-couples the bearing/frame noise utilizing three means.

1) The bearing 34 is assembled into the elastomer structure 38 by means of over-molding or press fit and the retainer 40 is placed over the elastomer structure 38. The resulting bearing/retainer assembly 32 is placed over the posts 44 of the frame 20 with the shaft 14 being supported by the bearings 34. The elastomer structure 38 acts as a decoupling device to reduce the transmitted acoustic energy to the frame 20. Due to the inherent damping properties of the elastomer material, very little acoustic energy is transmitted to the motor frame 20.

2) Furthermore, as noted above, there are two tabs 54 molded into the elastomer structure 38. These tabs 54 function as the structural and positional features to locate the bearing 34 to the frame structure 44. This allows the bearing/retainer assembly 32 to be held in and area that is not on the outside diameter of the bearing, which further decouples the bearing structural noise. The tabs 52 limit the path of noise from being amplified by the motor structure.

3) When the armature 12 is axially displaced within the desired endplay, the armature thrust surface contacts the bearing thrust surface and creates a "knock" sound. This bearing/retainer assembly 32 decouples this noise and any axial thrust noise from being amplified by the motor structure.

A second feature of the motor of the embodiment is the ability to adjust the motor endplay. Electric motors that utilize two sleeve bearings require endplay adjustment. Endplay can be defined as the axial movement of the armature after assembly. This is controlled by the difference in the resultant assembled dimension between the thrust faces of the armature and the distance between the inner thrust surfaces of the two bearings in the stator. Endplay in HVAC motors is usually controlled from 0.1 mm to 1 mm to eliminate axial knocking sounds when the armature experiences axial vibration. The embodiment provides a means to set the desire armature endplay upon assembly of the motor. The following is a description of the sequence of steps used in setting the endplay:

1) The armature 12 with thrust washers 56 (FIG. 2) is held concentric to the frame 20 in a fixture.

2) An elastomer/retainer assembly 32 is placed onto the end of the shaft 14 at each end of the armature 12.

3) The elastomer structure 38 is moved inwardly over the posts 44 until it bottoms out on the stop surface 46 of the frame 20.

4) The bearing retainer 40 with spring barbs 52 is pushed over the posts 44. The spring barb/clip feature prevents the retainer 40 from 'backing off' the posts 44. The retainer 40 is pushed down to the elastomer structure 38 and clamps and compresses the elastomer structure 38 between the retainer 40 and stop surface 46 until the desired endplay is set.

Only one end is required for endplay adjustment and for the invention to work. With both ends adjustable the armature position can be adjusted in the motor as well as the endplay.

Thus, the motor is held together using a one-piece skeleton frame 20 that locates all the key components, controls overall body length and provides structural component of the motor. This motor is preferably used in low noise applications or high temperature applications for automotive applications.

The motor 10 utilizes very few components overall and minimum material to provides its function. This lowers the component cost of the motor and noise due to low overall material content. The motor is also configured for automated assembly or manual assembly and the nature of the design permits simple operations.

With one component to act as the mechanical motor structure (frame 20) the following benefits can be obtained:

overall motor length control 1 piece frame controls all assembly tolerances and magnetic air gap Open frame 20 concept reduces material volume and resonance New motor sizes can be launched with minimal tooling Lightweight component Frame 20 does not conduct magnetism because it is non-ferrous.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An electric motor comprising:
   a one-piece frame, the frame including locating structure extending axially from an end portion thereof,
   a shaft,
   an armature disposed within at least a portion of the frame and being constructed and arranged to rotate the shaft,
   a commutator associated with the shaft,
   windings carried by the armature and connected to the commutator,
   permanent magnet structure carried by the frame and disposed generally adjacent to the armature,
   at least one brush arm coupled to an associated locating structure,
   a brush coupled with an associated brush arm so that the brush engages the commutator to deliver electric current to the windings, and
   a coil spring structure containing iron and disposed about at least a portion of the permanent magnet structure in a manner to clamp the permanent magnet structure with respect to the frame and to define a flux path for the motor.

2. The motor of claim 1, wherein the frame includes magnet receivers, the permanent magnet structure being received in the magnet receivers.

3. The motor of claim 2, wherein the coil spring structure is constructed and arranged to exert a spring load to retain the permanent magnet structure with respect to the magnet receivers.

4. The motor of claim 1, wherein the frame includes opposing end portions and two side members coupled to the end portions to define an open interior space.

5. The motor of claim 4, wherein the armature, windings and permanent magnet structure are disposed in the open interior space.

6. The motor of claim 1, wherein the locating structure includes at least two posts extending in a cantilever manner from the end portion of the frame.

7. The motor of claim 1, wherein the coil spring structure is composed of polygonal-shaped rod steel.

8. The motor of claim 1, further comprising at least one bearing/retainer assembly including a sleeve bearing operatively associated with end of the shaft to support the shaft for rotation, the bearing/retainer assembly being constructed and arranged to reduce transmission of noise from the sleeve bearing to the frame, and to control endplay of the armature.

9. The motor of claim 8, wherein the frame includes posts receiving and locating the at least one bearing/retainer assembly.

10. An electric motor comprising:
    a one-piece frame,
    a shaft,
    an armature disposed within at least a portion of the frame and being constructed and arranged to rotate the shaft,
    a commutator associated with the shaft,
    windings carried by the armature and connected to the commutator,
    permanent magnet structure carried by the frame and disposed generally adjacent to the armature,
    at least one brush arm coupled to the frame,
    a brush coupled with an associated brush arm so that the brush engages the commutator to deliver electric current to the windings, and
    a coil spring structure containing iron and disposed about at least a portion of the permanent magnet structure to clamp the permanent magnet structure with respect to the frame and to define a flux path for the motor.

11. The motor of claim 10, wherein the frame is a die-cast structure.

12. The motor of claim 10, wherein the frame includes magnet receivers, the permanent magnet structure being received in the magnet receivers.

13. The motor of claim 10, wherein the frame includes opposing end portions and two side members coupled to the end portions to define an open interior space.

14. The motor of claim 13, wherein the armature, windings and permanent magnet structure are disposed in the open interior space.

15. The motor of claim 13, wherein the frame further comprises locating structure extending from one of the end portions thereof.

16. The motor of claim 15, wherein the locating structure includes at least two posts extending in a cantilever manner from an end portion of the frame.

17. The motor of claim 10, wherein the coil spring structure is composed of polygonal-shaped rod steel.

18. The motor of claim 10, wherein the coil spring structure is constructed and arranged to exert a spring load to retain the permanent magnet structure with respect to the frame.

19. The motor of claim 10, further comprising at least one bearing/retainer assembly including a sleeve bearing operatively associated with end of the shaft to support the shaft for rotation, the bearing/retainer assembly being constructed and arranged to reduce transmission of noise from the sleeve bearing to the frame, and to control endplay of the armature.

20. The motor of claim 19, wherein the frame includes posts receiving and locating the at least one bearing/retainer assembly.

* * * * *